United States Patent
Schanz et al.

(10) Patent No.: US 8,881,565 B2
(45) Date of Patent: Nov. 11, 2014

(54) LOCKING SYSTEM

(76) Inventors: Jochen Schanz, Niedereschach (DE); Herbert Schwarz, Niedereschach (DE)

(*) Notice: Subject to any disclaimer, the term of this patent is extended or adjusted under 35 U.S.C. 154(b) by 258 days.

(21) Appl. No.: 13/522,994

(22) PCT Filed: Dec. 21, 2010

(86) PCT No.: PCT/DE2010/001497
§ 371 (c)(1),
(2), (4) Date: Jul. 19, 2012

(87) PCT Pub. No.: WO2011/088814
PCT Pub. Date: Jul. 28, 2011

(65) Prior Publication Data
US 2012/0312849 A1  Dec. 13, 2012

(30) Foreign Application Priority Data
Jan. 20, 2010  (DE) .................. 10 2010 005 272

(51) Int. Cl.
*B60R 25/00* (2013.01)
*B62J 7/08* (2006.01)
*B62J 9/00* (2006.01)

(52) U.S. Cl.
CPC ..... *B62J 7/08* (2013.01); *B62J 9/00* (2013.01)
USPC ............. 70/256; 224/413; 224/419; 224/448; 224/449

(58) Field of Classification Search
CPC ........ A45C 13/04; A45C 11/00; A45C 13/26; A45C 2009/005; B60N 2/01516; B60N 2/08; B62J 9/001; B62J 9/00; E05B 13/002; E05B 53/003; E05B 67/003; E05B 73/0005; E05B 77/265; E05B 83/18

USPC ............. 70/256; 224/413, 419, 421, 448, 449
See application file for complete search history.

(56) References Cited

U.S. PATENT DOCUMENTS

| | | | | | |
|---|---|---|---|---|---|
| 1,748,875 | A | * | 2/1930 | Fisher | 70/240 |
| 1,762,116 | A | * | 6/1930 | Bolles et al. | 70/247 |
| 1,788,473 | A | * | 1/1931 | Smith | 70/170 |
| 1,805,042 | A | * | 5/1931 | Heine | 70/240 |
| 3,062,033 | A | * | 11/1962 | Schmalfeldt | 70/256 |
| 6,059,327 | A | * | 5/2000 | Yoshikuwa | 292/216 |

(Continued)

FOREIGN PATENT DOCUMENTS

| | | |
|---|---|---|
| DE | 84 24 404 U1 | 11/1984 |
| DE | 42 30 972 A1 | 5/1993 |
| WO | 01/02238 A1 | 1/2001 |
| WO | 2007/045371 A1 | 4/2007 |

*Primary Examiner* — Suzanne Barrett
(74) *Attorney, Agent, or Firm* — Gudrun E. Huckett

(57) ABSTRACT

The invention relates to a locking system for a carrying case, comprising a main body (1), which has a closure element (6) that can be pivoted into an open position and into a closed position and that has a receptacle (7) for a retaining frame (8), wherein in order to allow the carrying case to be attached to the retaining frame (8) using only one hand, a spring-loaded latch element (16) and a pulling lever (21) connected to the latch element (16) are provided. In the open position of the closure element (6), which is under the influence of a spring (11), the latch element (16) lies against the closure element, and in the closed position of the closure element (6), the latch element is locked with the closure element. The latch element (16) is disengaged from the closure element (6) by operating an unlocking unit (2).

15 Claims, 3 Drawing Sheets

(56) References Cited

U.S. PATENT DOCUMENTS

| | | |
|---|---|---|
| 6,095,473 A | 8/2000 | Engers |
| 6,598,436 B2 * | 7/2003 | Ponn et al. .................. 70/256 |
| 6,623,071 B2 * | 9/2003 | Kawamoto et al. ...... 297/195.13 |
| 6,701,760 B1 * | 3/2004 | Elliason ....................... 70/256 |
| 6,729,515 B2 * | 5/2004 | Nicosia et al. ............... 224/413 |
| 6,779,372 B2 * | 8/2004 | Arlt et al. ..................... 70/237 |
| 6,871,519 B2 * | 3/2005 | Butera et al. ................. 70/256 |
| 7,766,201 B2 * | 8/2010 | Chuang ....................... 224/458 |
| 8,028,877 B2 * | 10/2011 | Lien ............................ 224/417 |
| 8,152,036 B2 * | 4/2012 | Visenzi ....................... 224/413 |
| 8,292,139 B2 * | 10/2012 | Golub et al. ................ 224/419 |
| 2011/0073627 A1 * | 3/2011 | Iida et al. ..................... 224/413 |
| 2013/0043289 A1 * | 2/2013 | Visenzi ....................... 224/449 |

* cited by examiner

LOCKING SYSTEM

BACKGROUND OF THE INVENTION

The invention concerns a locking system for a carrying case with a main body which comprises a closure member pivotable into an open position and into a locked position and provided with a receptacle for a retaining frame.

Such a locking system is disclosed in the utility model DE 84 24 404 U1. This locking system is embodied as a lockable hook lever closure and is arranged on a motorcycle case. For attaching the case on the retaining frame of the motorcycle, the case is first placed onto a lower horizontal leg of the retaining frame. Subsequently, a hook lever is attached to the upper horizontal leg of the retaining frame and by pivoting the hook lever, the case is secured on the retaining frame. In the backwardly pivoted locked position, the hook lever is in a dead position and cannot return by itself into the open position. Now the hook lever closure is secured by a lock against an unauthorized opening action. For attaching the case with the known locking system on the retaining frame, both hands of the driver are disadvantageously required because with one hand the case must be held and with the other hand the hook lever closure must be actuated.

The object of the invention is thus seen in further developing a locking system of the aforementioned kind in such a way that the case can be attached with only one hand on the retaining frame.

SUMMARY OF THE INVENTION

As a solution to this object it is proposed according to the invention that the locking system of the aforementioned kind is configured in accordance with the following features: a spring-loaded locking element and a pull lever connected with the locking element are provided, wherein, in the open position of the closure member subjected to the action of a spring, the locking element is resting against it and, in the locked position of the closure member, is locked therewith and, by actuation of a release unit, the locking element disengages the closure member.

In the locking system according to the invention, the closure member in the basic state is secured always in the open position by the spring. When now a carrying case that is provided with the locking system is to be attached to the retaining frame, the case is held with one hand and first is placed onto a lower transverse stay of the retaining frame. Subsequently, the case is forced in the direction of an upper transverse stay of the retaining frame whereby the closure member that is maintained in the open position engages the retaining frame. The case with the locking system is now forced farther in the direction of the retaining frame so that the closure member is pivoted farther and the spring-loaded locking element that is resting against the closure member and that up to this point has released the closure member to assume the open position is now moved into the locked position by the force of the spring and locks the closure member. Now the closure member can no longer be pivoted back into an open position and the case is thus secured on the retaining frame. The entire process of suspending the case on the retaining frame can be carried out with one hand. When it is desired to remove the case again from the retaining frame, by actuation of the release unit the locking element is retracted against the spring force and releases the closure member so that pivoting of the closure member into its open position is enabled again.

One embodiment of the invention provides that the release unit is arranged remote from the main body and, by actuation of the release unit, a cable pull disengages the locking element from the closure member. The release action can thus be realized at a freely accessible side of the case. Within the main body, an actuating grip can also be arranged on the pull lever in order to actuate the release action from the interior of the case.

Considerable forces are acting on the carrying case that is attached to the retaining frame in particular upon off-road driving. Accordingly, the locking system must be very stable and massive. One embodiment of the invention therefore provides that the locking member has a locking plate that interacts with the locking element. Advantageously, the locking element is also of a plate-shaped configuration and has a bent end section on which the locking plate is resting in the open position of the closure member. The locking system therefore has no thin stays or the like which could break when under great load but instead, as a whole, the elements that are relevant for the locking action are very stable and massive as a result of their plate-shaped configuration. In order for the locking action to be realized also in a reliable way, a further embodiment of the invention provides that on the bent end section of the locking element at least one pressure spring is supported. Usually, two pressure springs are used so that even upon failure of one of the pressure springs the locking system is still effective.

Retaining frames for a motorcycle case can be designed differently. The receptacle of the closure member is matched to the corresponding shape of the retaining frame. Since the retaining frames are usually of a tubular design, the receptacle of the closure member is expediently shaped of a semi-tubular shape. Upon attachment of the case on the retaining frame, the corresponding tubular transverse stay of the retaining frame then engages with form fit the semi-tubular receptacle of the closure member so that across the entire length of the closure member a safe securing action is ensured.

As already mentioned above, the individual parts of the locking system are stable and of a massive configuration. Accordingly, for a release action corresponding great forces must be applied in order to move the parts. A further embodiment of the invention therefore provides that the release unit has a rotary lever which is connected to the cable pull. By means of the rotary lever, large forces can be transmitted at minimal force expenditure for the driver. Accordingly, the release mechanism within the main body must also operate with rotary forces. Advantageously, the pull lever is positioned on an axle with an eccentric lever which releases upon actuation of the pull lever the locking element. In order to secure the release unit against unauthorized opening, it is expediently designed to be lockable.

The main body of the locking system can be integrated into a sidewall of the case so that in the locked position and with the case being locked this sidewall is only accessible with difficulty or even not accessible at all for the driver. Accordingly, a further embodiment of the invention provides that the main body is arranged on a sidewall of a case and the release unit is arranged on another wall of the case. In this way, the locking system can be actuated from a side of the case that is easily accessible for the driver.

BRIEF DESCRIPTION OF THE DRAWINGS

The invention will be explained in more detail in the following with the aid of the drawing. The drawing shows one embodiment of the invention. In this connection, it is shown in.

DESCRIPTION OF PREFERRED EMBODIMENTS

Figure 1:
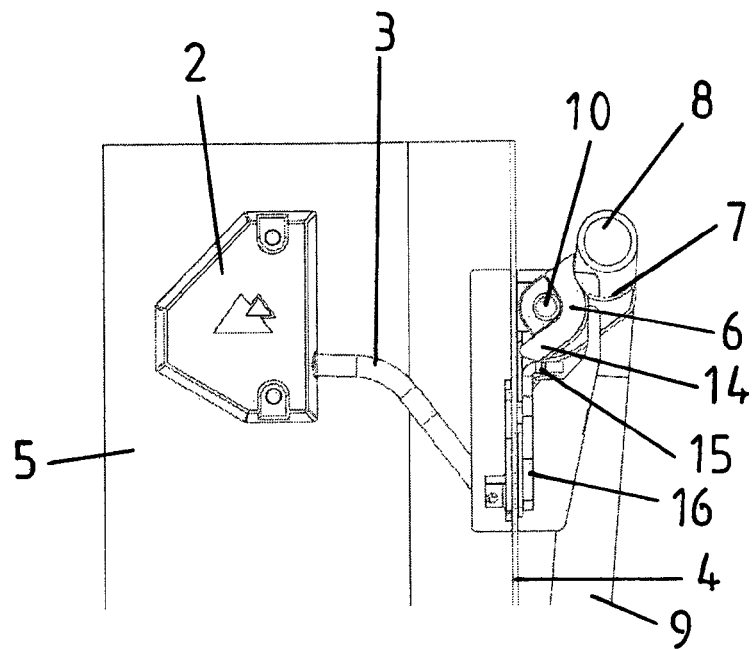
FIG. 1 a cross-section in open position.
Figure 2:
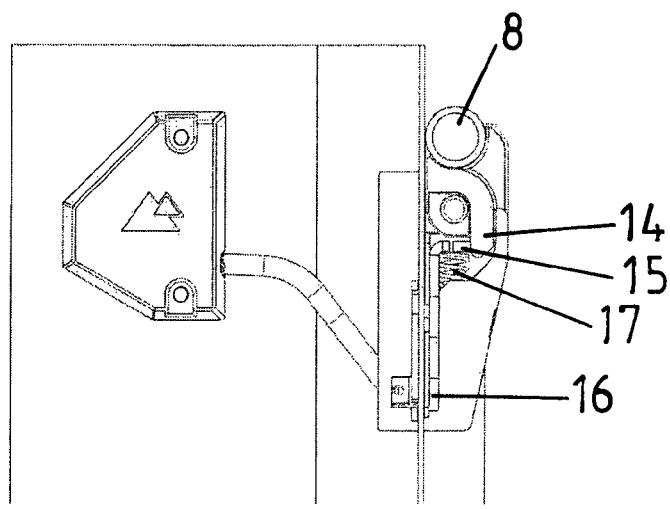
FIG. 2 a cross-section in locked position.
Figure 3:
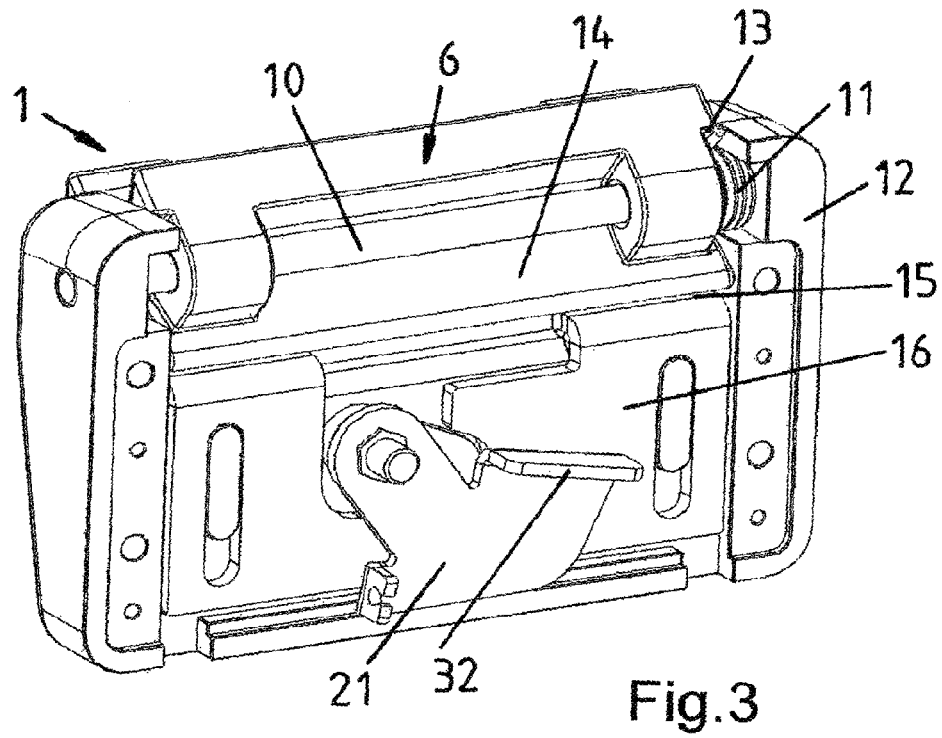
FIG. 3 a perspective view of the main body in open position.
Figure 4:
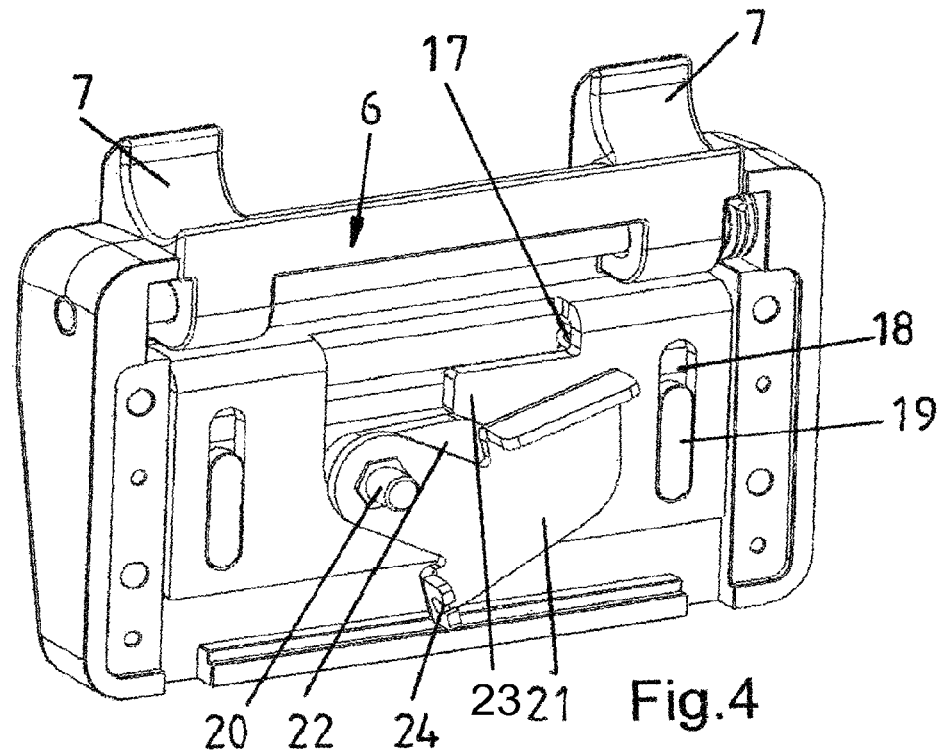
FIG. 4 a perspective view of the main body in locked position.
Figure 5:
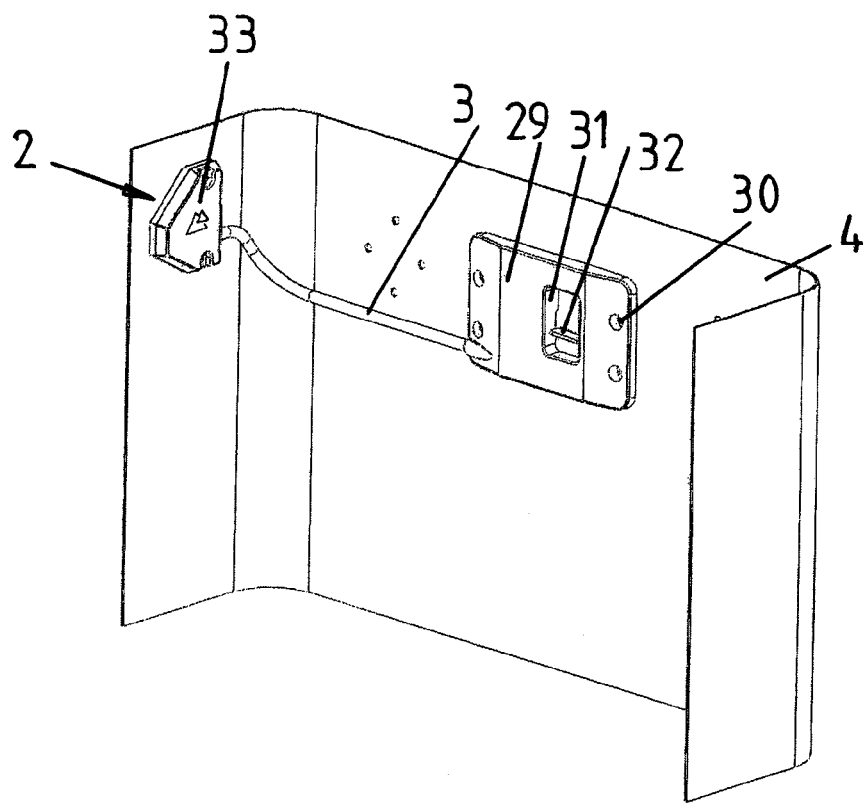
FIG. 5 a perspective view of the arrangement of the locking system on a case.
Figure 6:
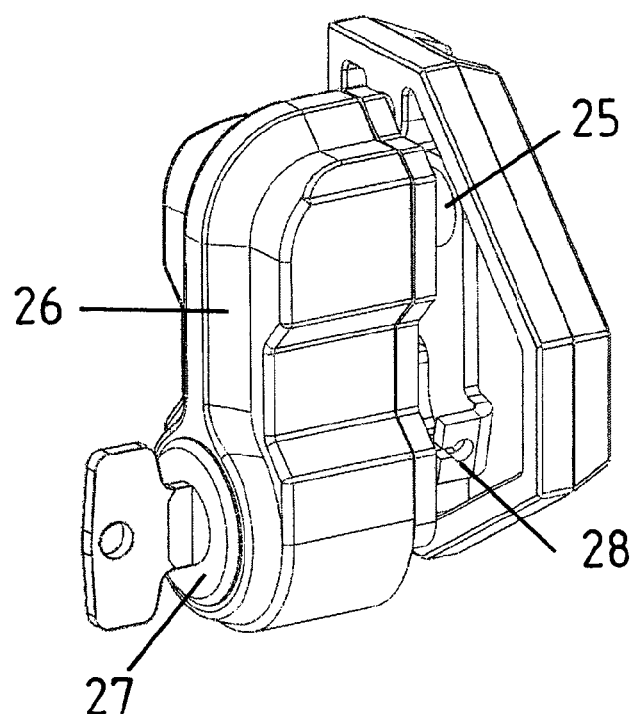
FIG. 6 a perspective view of the release unit.

The locking system has a main body 1 and a release unit 2 which are connected to each other by a cable pull 3, usually a Bowden cable. The main body 1 is arranged on a sidewall 4 of a carrying case while the release unit 2 is arranged on an adjoining wall 5 of the carrying case. The cable pull 3 extends in the interior of the case along the inner side of the sidewall 4 and the adjoining wall 5. The main body 1 has a closure member 6 with a receptacle 7 for a retaining frame 8, the closure member being pivotable into an open position and into a locked position. The retaining frame 8 is an upper tubular transverse stay of a motorcycle luggage rack 9. The closure member 6 is pivotably supported on an axle 10 which is arranged in the upper area that is facing the retaining frame 8 of the main body 1. The closure member 6 is maintained in the open position by the action of a spring 11, usually a leg spring. The spring 11 is also supported on the axle 10 and is located between the sidewall 12 of the main body 1 and the closure member 6. One leg of the spring 11 is supported on the inner side of the sidewall 12 and the other leg of the spring 11 is supported in a recess 13 of the closure member 6. The receptacle 7 for the retaining frame 8 is embodied of a semi-tubular shape at the two end areas of the closure member 6. The closure member 6 has a massively embodied locking plate 14 which, with its free end, is resting on the topside of a bent end section 15 of a locking element 16 in the open position. The locking element 16 is acted upon by two pressure springs 17 which are supported with one end at the inner side of the bottom of the main body 1 and with the other end are supported on the bottom side of the bent end section 15 of the locking element 16. The locking element 16, aside from the bent end section 15, is of a plate-shaped configuration and has two slots 18. A guide web 19 of the main body 1 is projecting into each slot 18. The locking element 16 is guided along the guide web 19 upon movement from the open position into the locked position. Moreover an axle 20 is provided in the main body 1 on which a pull lever 21 and an eccentric lever 22 are arranged. The eccentric lever 22 engages a nose 23 of the locking element 16. The pull lever 21 has a projection 24 for attachment of one end of the cable pull 3. The release unit 2 has a rotary lever 26 that is pivotable about axle 25. The rotary lever is lockable by a lock 27 so that it can no longer be pivoted. To the rotary lever 26 a projection 28 is connected on which the cable pull 3 is attached with its other end. Toward the interior of the case the main body 1 is provided with a cover 29 which secures by fasting means 30 the main body 1 on the outer side of the sidewall 4. Through an opening 31 in the cover 29 an actuating grip 32 on the pull lever 21 is accessible. Accordingly, the release action can also be realized from the interior of the case. A further cover 33 on the inner side of the wall 5 is also provided for the release unit 2.

When a carrying case that is embodied with the locking system according to the invention is to be attached to a retaining frame of a motorcycle luggage rack, then the carrying case is held with one hand and first placed onto a lower transverse stay, not illustrated, of the retaining frame. Then the carrying case is forced against the upper transverse stay of the retaining frame 8 whereby the retaining frame 8 automatically engages the receptacle 7 of the closure member 6 because the closure member 6, under the action of the spring 11, is always in the open position in the basic state. When the retaining frame 8 now contacts the receptacle 7 and the carrying case is pushed farther in the direction toward the retaining frame 8, then this pressure effects that the closure member 6 is pivoted against the force of the spring 11 about axle 10. The locking plate 14 then slides along the topside of the locking element 16. When the retaining frame 8 has reached the outer wall of the carrying case and is thus in the locked position, the locking plate 14 then releases the locking element 16 and the locking element 16 is pushed by the force of the springs 17 upwardly and locks thus the locking plate 14. Pivoting back of the locking plate 14 is no longer possible now because the locking element 16 is resting against the inner side of the locking plate 14 and blocks it. The carrying case is now secured in the locked position on the retaining frame 8. For the entire locking movement only one hand of the driver is required. In order to secure the case additionally on the lower transverse stay on the carrying case at least one hook is attached which after placement of the carrying case onto the lower transverse stay engages behind or around this transverse stay. The carrying case is secured by the tension between the upper transverse stay and the lower transverse stay, the tension being generated by the closure member 6 that has been moved into the locked position because the closure member in the locked position is forced against the upper transverse stay and in this way presses the carrying case onto the lower transverse stay. In order to remove the carrying case again from the retaining frame 8, the driver will pivot the rotary lever 26 so that the cable pull 3 is actuated and the pull lever 21 is pivoted. Pivoting of the pull lever 21 also causes the eccentric lever 22 to pivot and now forces the locking element 16 against the force of the pressure spring 17 in downward direction until the closure plate 14 is released again by the bent end section 15. After release the closure member 6 snaps by action of the spring 11 into its open position so that now the case can be removed from the retaining frame 8. In order to secure the rotary lever 26 against unauthorized use and also to secure it while traveling, the rotary lever 26 is locked by the lock 27.

What is claimed is:

1. A locking system for a carrying case, the locking system comprising:
   a main body comprising a closure member that is pivotable into an open position and into a locked position, wherein the closure member comprises a receptacle adapted to accommodate a retaining frame;
   a spring-loaded locking element;
   a pull lever interacting with the locking element;
   a spring acting on the closure member and forcing the closure member into an open position;
   wherein, in the open position of the closure member, the locking element is resting against the closure member;
   wherein the locking element locks the closure member in the locked position;
   a release unit that, when actuated, causes the locking element to release the closure member from the locked position;
   an axle arranged on the main body and an eccentric lever connected to the axle and engaging the locking element, wherein the pull lever is connected to the axle and, when the pull lever is actuated, the eccentric lever is actuated and causes the locking element to release the closure member from the locked position.

2. The locking system according to claim 1, further comprising a cable pull connected to the release unit, wherein the release unit is arranged remote from the main body, wherein, when the release unit is actuated, the cable pull actuates the pull lever and causes the locking element to release the closure member from the locked position.

3. The locking system according to claim 1, wherein the closure member has a locking plate interacting with the locking element.

4. The locking system according to claim 3, wherein the locking element is plate-shaped and has a bent end section on which the locking plate is resting in the open position of the closure member.

5. The locking system according to claim 1, wherein the receptacle of the closure member is of a semi-tubular shape.

6. The locking system according to claim 2, wherein the release unit has a rotary lever connected to the cable pull.

7. The locking system according to claim 1, wherein the release unit is lockable.

8. The locking system according to claim 1, wherein the main body is arranged on a sidewall of a carrying case and the release unit is arranged on another wall of the carrying case.

9. A locking system for a carrying case, the locking system comprising:
- a main body comprising a closure member that is pivotable into an open position and into a locked position, wherein the closure member comprises a receptacle adapted to accommodate a retaining frame;
- a spring-loaded locking element;
- a pull lever interacting with the locking element;
- a spring acting on the closure member and forcing the closure member into an open position;
- wherein, in the open position of the closure member, the locking element is resting against the closure member;
- wherein the locking element locks the closure member in the locked position;
- a release unit that, when actuated, causes the locking element to release the closure member from the locked position;
- wherein the closure member has a locking plate interacting with the locking element;
- wherein the locking element is plate-shaped and has a bent end section on which the locking plate is resting in the open position of the closure member;
- at least one pressure spring resting on the bent end section of the locking element.

10. The locking system according to claim 9, further comprising an axle arranged on the main body and an eccentric lever connected to the axle and engaging the locking element, wherein the pull lever is connected to the axle and, when the pull lever is actuated, the eccentric lever is actuated and causes the locking element to release the closure member from the locked position.

11. The locking system according to claim 9, further comprising a cable pull connected to the release unit, wherein the release unit is arranged remote from the main body, wherein, when the release unit is actuated, the cable pull causes the locking element to release the closure member from the locked position.

12. The locking system according to claim 11, wherein the release unit has a rotary lever connected to the cable pull.

13. The locking system according to claim 9, wherein the receptacle of the closure member is of a semi-tubular shape.

14. The locking system according to claim 9, wherein the release unit is lockable.

15. The locking system according to claim 9, wherein the main body is arranged on a sidewall of a carrying case and the release unit is arranged on another wall of the carrying case.

\* \* \* \* \*